United States Patent [19]

Burke

[11] Patent Number: 5,199,797
[45] Date of Patent: Apr. 6, 1993

[54] OIL RING AND OIL-RING GUIDE SYSTEM FOR SLEEVE BEARINGS

[75] Inventor: Robert R. Burke, Cincinnati, Ohio

[73] Assignee: Siemens Energy & Automation, Inc., Alpharetta, Ga.

[21] Appl. No.: 834,444

[22] Filed: Feb. 12, 1992

[51] Int. Cl.⁵ ............................................. F16C 17/12
[52] U.S. Cl. .................................................. 384/406
[58] Field of Search .............. 384/406, 405, 404, 464, 384/403, 473

[56] References Cited

U.S. PATENT DOCUMENTS

| | | | |
|---|---|---|---|
| 1,551,312 | 8/1925 | Knape | 384/406 |
| 1,564,832 | 12/1925 | Dana | 384/406 |
| 4,531,845 | 7/1985 | Heshmat | 384/406 |
| 4,597,679 | 7/1986 | Wlodkowski | 384/406 |

*Primary Examiner*—Lenard A. Footland

[57] ABSTRACT

An oil ring guide system comprises a shaft mounted for rotation in either of two directions. Bearings support the shaft at two spaced-apart locations. Each bearing is formed with a pair of slots. A reservoir is mounted below each bearing. An oil ring is received in each of the four slots. Each oil ring is supported by and encircles the shaft and dips into the reservoir, whereby rotation of the shaft in either direction causes rotation of the oil rings in the same direction so that the oil rings carry oil from the reservoir into the bearing for lubrication thereof. Eight guide rods extend through the upper portion of the bearings. One pair of guide rods is displaced about the shaft axis 45° in a clockwise direction from the vertical. The pair of guide rods associated with the other oil ring of the same bearing is displaced about the shaft axis 45° counterclockwise from the vertical. The two pairs of guide rods associated with the other bearing are similarly displaced respectively clockwise and counterclockwise from the vertical. Thus the oil rings deliver equal amounts of oil regardless of the direction of shaft rotation. The guide rods reduce the friction between the oil rings and the bearing, thereby increasing the rotational speed of the oil rings for a given rotational speed of the shaft and increasing the amount of oil delivered to the bearings.

9 Claims, 6 Drawing Sheets

OIL RING AND OIL-RING GUIDE SYSTEM FOR SLEEVE BEARINGS

BACKGROUND OF THE INVENTION

1. Field of the Invention

This invention relates to oil rings and oil-ring guide systems and more particularly to a novel and highly effective oil ring and oil-ring guide system for sleeve bearings.

2. Description of the Prior Art

A major determinant of the useful life of rotating machinery such as electric motors and generators is the effectiveness with which the machine bearings are lubricated. Any rotating machine such as an electric motor or generator has a stationary part and a rotating part. In an electric motor or generator, these parts, or at least the portions thereof that generate the electromagnetic fields, are respectively called the "stator" and the "rotor." The rotor rotates on a shaft, and the shaft is supported by sleeve bearings that are stationary with respect to the stator.

Friction is generated in the sleeve bearings during operation of the machine, and measures must be adopted to minimize the friction if the bearings are not to wear out prematurely. The need to minimize friction becomes greater the greater the size and power of the machine, both because, other factors being equal, more friction is generated by a large, powerful machine and because the cost of a large, powerful machine makes it all the more important to maximize its useful life.

In electric motors and generators that are "large," for example that generate from several horsepower to ten thousand horsepower or more, it is customary to employ oil rings to help to lubricate and cool the sleeve bearings. An oil ring is an annulus that is received within a slot formed in the bearing bushing, encircles and rides on the shaft, and dips into an oil reservoir mounted below the bearing bushing. Rotation of the shaft causes rotation of the oil ring in the same direction so that the oil ring carries oil from the reservoir into the bearing for lubrication thereof.

A problem associated with the operation of conventional oil rings is that they do not deliver as much oil to the bearing as is required for optimum lubrication of the bearing during operation of the machine. By the nature of its construction, the oil ring cannot be geared to the rotor shaft, and the oil ring rotates in the direction of shaft rotation only because the oil ring rides on the shaft and a certain friction develops as the shaft rotates.

However, friction is also developed between the oil ring as it rotates and the walls of the slot in which the oil ring is received. These walls must be fairly close to the oil ring in order to guide it properly and prevent it from wandering in the axial direction of the shaft. The walls of the slot inevitably have a certain roughness. The degree of roughness can be minimized by spending a great deal of money on machining, but regardless of how carefully the walls are machined, they will exhibit some imperfections. Moreover, the walls extend over a considerable fraction of the circumference of the oil rings, as compared to the footprint or area of contact between the oil rings and the shaft. The latter footprint is very small, since the radius of curvature of the shaft is less than that of the oil rings. In addition, the oil bridges the stationary and moving surfaces and itself produces drag tending to slow the rotation of the oil ring.

As a result of the friction between the oil ring and the walls of the slot in the sleeve bearing in which the oil ring is received, plus the drag caused by the oil itself, and because the inner diameter of the oil ring exceeds the outer diameter of the shaft, the rotational speed of the oil ring is very much lower than the rotational speed of the shaft. For example, in the case of a shaft running at 3600 rpm, a conventional oil ring will rotate at about 120 rpm.

A rotational speed of the oil ring of 120 rpm is sufficient to provide a good deal of lubrication to the sleeve bearing, but not as much as is required in order to maximize the life of the bearing. To achieve maximum bearing life, it would be necessary to increase the rotational speed of the oil ring by a substantial factor. This cannot easily be done because of the lack of gearing between the oil ring and the shaft and, of course, because of the presence of oil on the oil ring and shaft, which renders the coefficient of friction between the oil ring and shaft very low so that the oil ring easily slips on the shaft.

OBJECTS AND SUMMARY OF THE INVENTION

An object of the invention is to improve the efficiency of oil rings in delivering oil from an oil reservoir or sump to a sleeve bearing.

More specifically, an object of the invention is to increase the rotational speed of the oil ring for a given rotational speed of the shaft, in order to deliver more oil from the reservoir to the bearing.

The foregoing and other objects of the invention are attained in accordance with one independent aspect of the invention by the provision of an oil-ring guide system comprising a shaft elongate along a shaft axis and mounted for rotation about the shaft axis in at least one direction; a bearing supporting the shaft and formed with an oil-ring slot; an oil reservoir mounted below the bearing; and an oil ring received within the slot, supported by and encircling the shaft, and dipping into the reservoir, whereby rotation of the shaft in said direction causes rotation of the oil ring in the same direction so that the oil ring carries oil from the reservoir into the bearing for lubrication thereof; the slot being shaped with a protrusion extending towards the oil ring on at least one side of the oil ring to assist in guiding the oil ring, and the protrusion having a dimension that is small compared to the dimension of the slot in the direction of rotation of the oil ring, thereby reducing the drag on the oil ring and increasing the rotational speed of the oil ring in relation to the rotational speed of the shaft and increasing the amount of oil delivered to the bearing at a given rotational speed of the shaft.

Preferably, the slot is formed with a protrusion extending toward the oil ring on both sides of the oil ring.

Preferably also, two oil rings are provided for each bearing, and the protrusions for guiding one of the oil rings in a given bearing are displaced around the shaft axis 45° clockwise from the vertical, while the protrusions for guiding the other oil ring in the same bearing are displaced around the shaft axis 45° counterclockwise from the vertical. This provides a uniform response in the delivery of oil to the bearing regardless of the direction of rotation of the shaft.

Since there are normally two bearings supporting the shaft, and the structure described above is preferably replicated for each of the bearings, four oil rings are provided altogether for a given machine.

The protrusions are preferably formed by oil-ring guides in the form of dowels or rods captured by the bearing bushing and extending in a direction that is radial with respect to the shaft axis, each rod having a cylindrical surface that protrudes into the slot.

In accordance with an independent aspect of the invention, an oil ring is formed about an oil-ring axis and has a pair of lateral surfaces lying in planes that are radial with respect to the oil-ring axis, an inner surface connecting the lateral surfaces, and a pair of frusto-conical surfaces tapering towards each other in a radially outward direction respectively from radially outer edges of the lateral surfaces.

The frusto-conical surfaces preferably form an angle within the range of 5° to 30° with respect to the radial direction. This angle is ideally about 15°. The lateral surfaces preferably have a radial dimension that is small compared to the radial distance between the inner and outer surfaces of the oil ring.

BRIEF DESCRIPTION OF THE DRAWINGS

A better understanding of the objects, features and advantages of the invention can be gained from a consideration of the following detailed description of the preferred embodiment of the invention, in conjunction with the appended figures of the drawing, wherein a given reference character always designates the same element or part, and wherein.

DESCRIPTION OF THE PREFERRED EMBODIMENT

Figure 1:
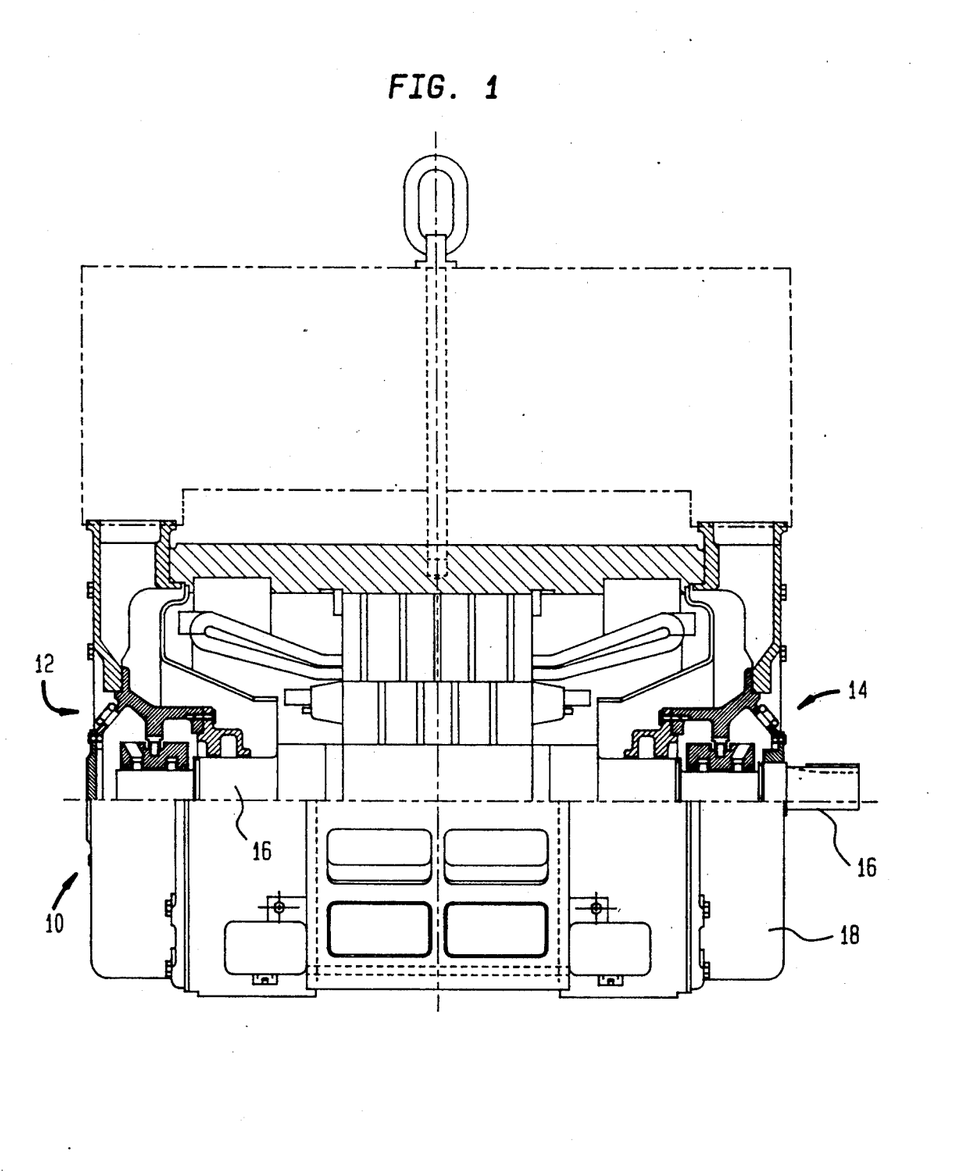
FIG. 1 is a view, partly sectioned along a rotational axis, of a motor to which the present invention is applicable.
Figure 2:
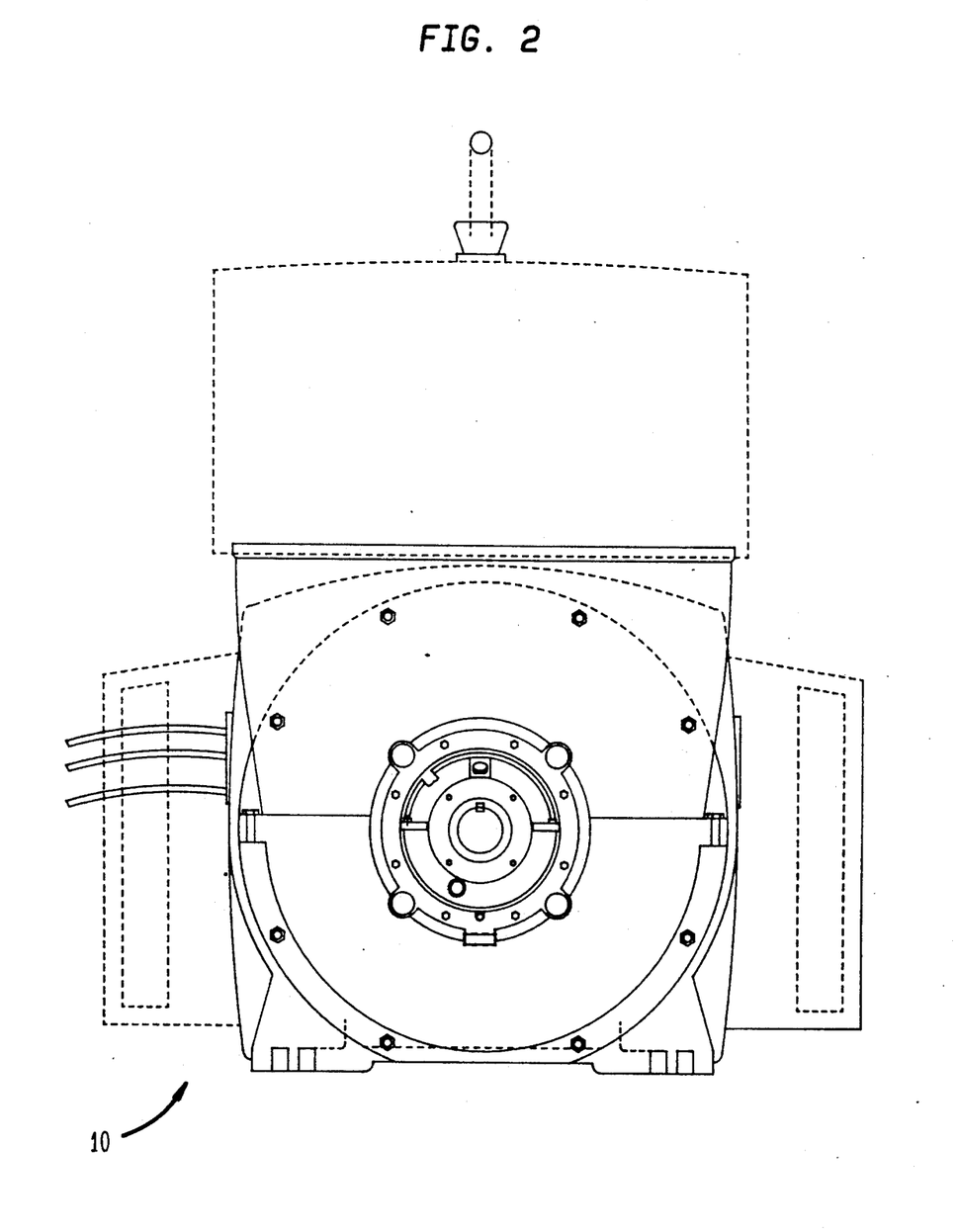
FIG. 2 is an end elevation of the motor of FIG. 1.

FIGS. 1 and 2 show a motor 10 constructed in accordance with the invention. While a motor is used for convenience in explanation, other rotating electrical machinery, such as a generator or an alternator, could equally well be used. The invention is applicable to all such rotating machinery and even to nonelectrical machinery, such as internal and external combustion engines, provided that the pressure developed in the region of the oil rings is not so high as to preclude their use. The invention is applicable, in other words, to any rotating machine in which an oil ring is usefully employed to deliver oil from an oil sump or reservoir to a bearing.

As FIG. 1 best shows, the motor 10 includes an oil-ring guide system 12 at one end and an oil ring guide system 14 at the opposite end of a shaft 16.

Figure 3:
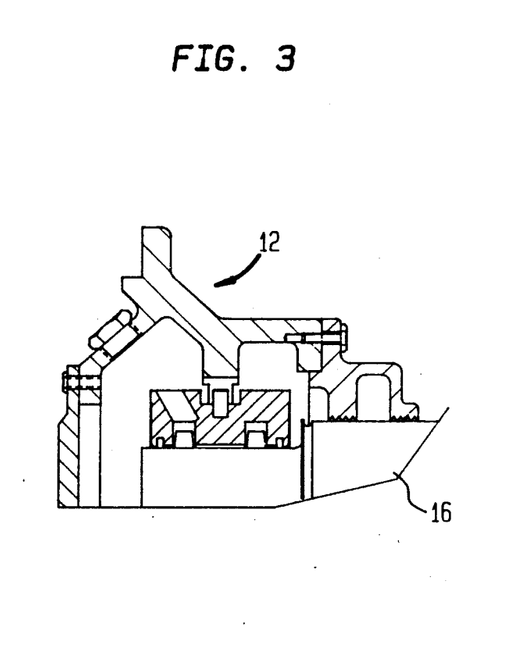
FIG. 3 is a sectional view on a larger scale of a portion of a sleeve bearing at one end of the motor shown in FIG. 1.
Figure 4:
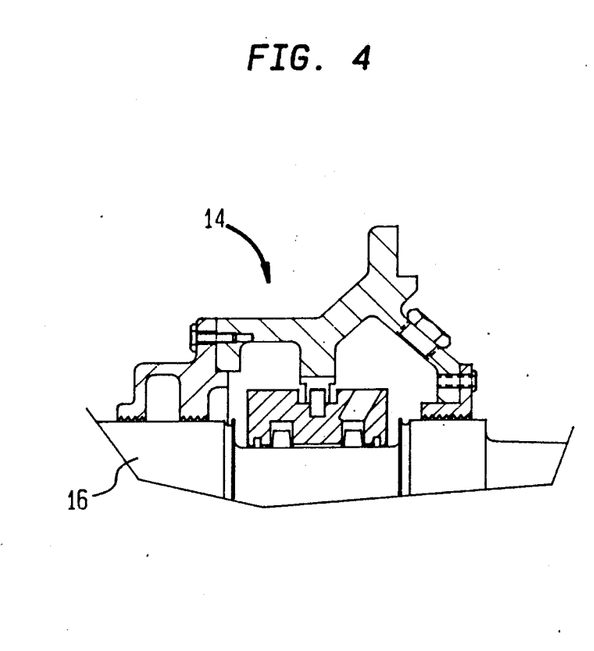
FIG. 4 is a sectional view on the same scale as FIG. 3 of a similar portion at the other end of the motor of FIG. 1.

FIGS. 3 and 4 show the oil ring guide systems 12 and 14 on a larger scale. As those figures best show, the oil ring guide systems 12 and 14 are substantially mirror images of each other. They need not be mirror images of each other, however, and in particular there may be differences in their construction reflecting the fact that the shaft 16 extends out from the motor housing 18 at only one end, as best illustrated in FIG. 1. However, for purposes of the invention, it is sufficient to describe in detail the structure of the oil-ring guide system 14, since the oil-ring guide system 12 is constructed on the same principle.

Figure 5:
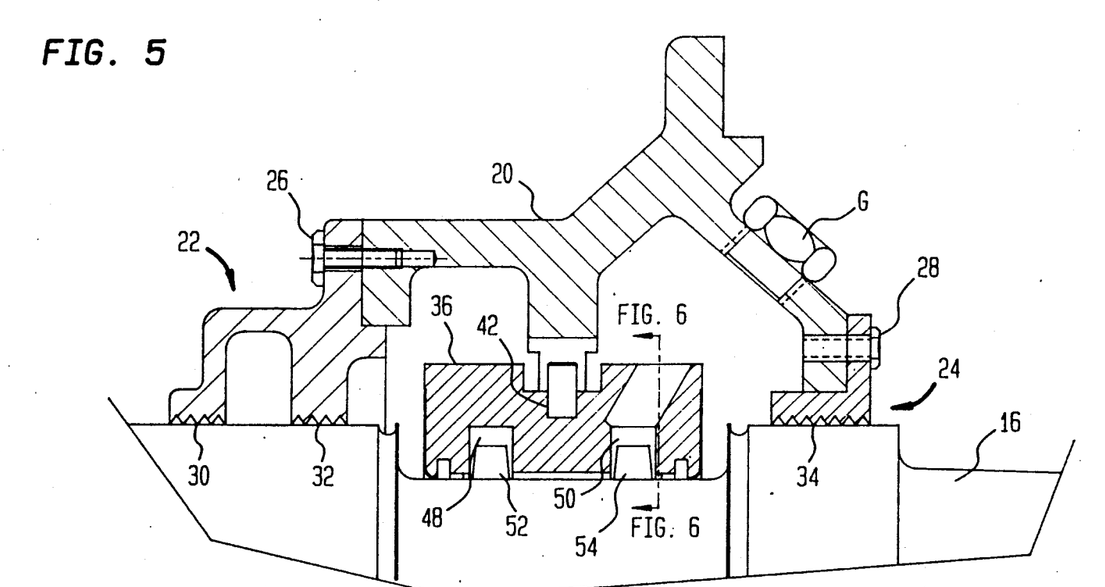
FIG. 5 is a view corresponding to FIG. 4 on a still larger scale.

FIG. 5 best shows the structure of the oil ring guide system 14. The shaft 16 is mounted for rotation in at least one direction and normally in both directions. A bearing is formed with a cast-iron housing 20, an inner oil seal 22, and an outer oil seal 24. The inner oil seal is secured to the bearing housing 20 by bolts 26, and the outer oil seal 24 is secured to the bearing housing 20 by bolts 28. The bolts 26 and 28 are arranged circumferentially around the shaft 16. The inner oil seal 22 has a pair of sealing members 30 and 32 that encircle the shaft 16, and the outer oil seal 24 has a sealing member 34 that encircles the shaft 16 where it emerges towards the exterior from the bearing housing. These seals 30, 32, 34 prevent leakage of oil in the axial direction of the shaft 16 beyond the bearing itself. A view glass G enables observation of the oil rings in operation.

Figure 6:
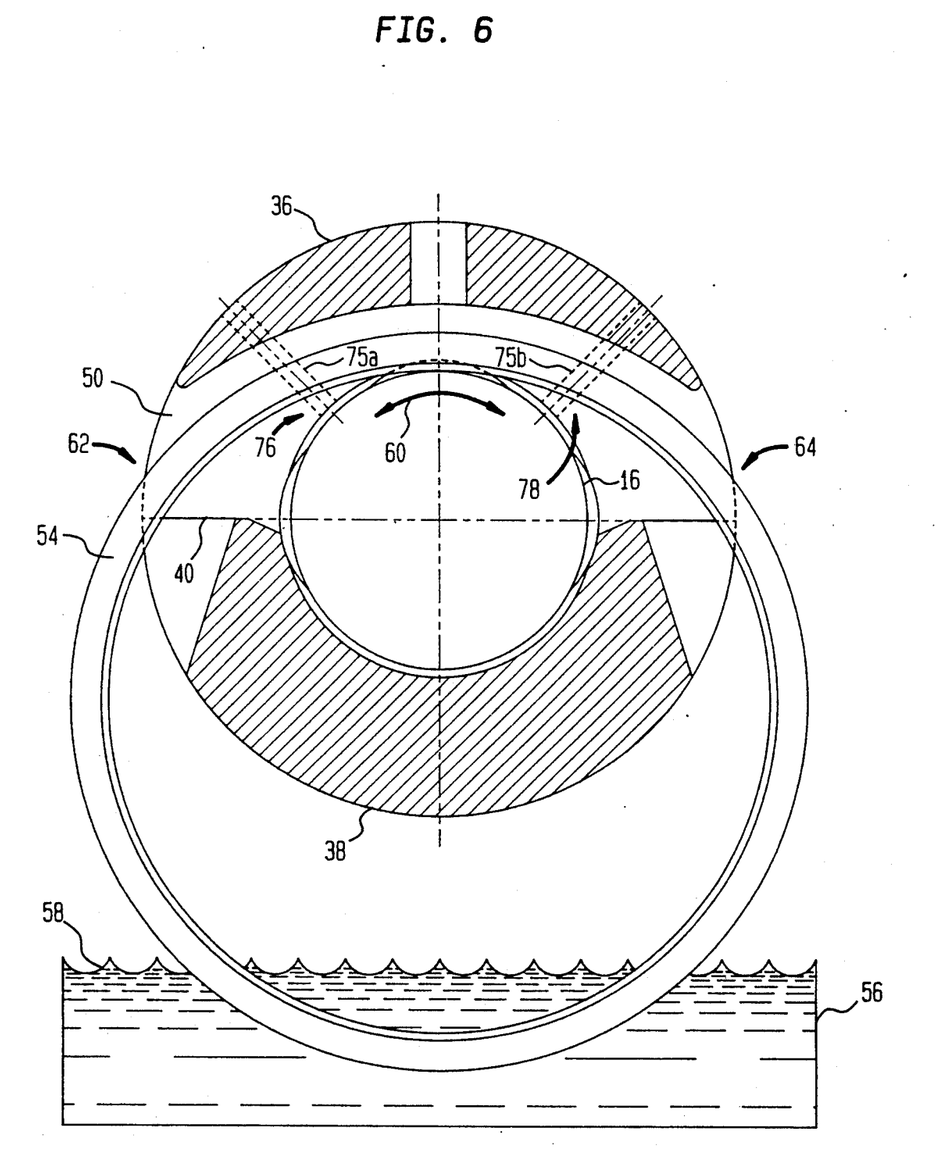
FIG. 6 is a view partly in section looking in the axial direction of an oil ring mounted on a shaft in accordance with the invention.

The bearing is formed with an upper bearing bushing 36 and a lower bearing bushing 38 (see also FIG. 6). These bearing bushings 36 and 38 are respectively arranged above and below a split line 40.

An Anti-rotation pin 42 is inserted into the upper half of the bearing bushing 36 to prevent the bushing from moving in rotation when the shaft 16 rotates, and axial shims (not shown) are provided in the lower half of the bearing bushing 38 to ensure proper axial spacing of the bushing.

The bearing bushing is formed with slots 48 and 50 each having a width in the axial direction of the machine slightly greater than the axial thickness of oil rings 52 and 54 respectively accommodated therein.

FIG. 6 shows the slot 50 and the oil ring 54 accommodated therein. The slot 50 is formed at least in the upper bearing bushing 36 and may also extend into the lower bearing bushing 38, as indicated in FIG. 6.

The oil rings exemplified by the oil ring 54 in FIG. 6 encircle and rest upon the shaft 16. The oil rings dip into an oil sump or reservoir 56 having an oil level represented at 58. When the shaft 16 rotates in either direction, as indicated by a double-headed arrow 60 in FIG. 6, the oil ring 54 rotates in the same direction. By this rotation, the oil ring picks up oil from the reservoir 56 and delivers it into the bearing. However, the bearing is of course quickly coated with oil, so that the coefficient of sliding friction between the oil ring 54 and the shaft 16 is very low. Accordingly, for a rotational speed of the shaft of, say 3600 rpm, which is a typical speed for electric motors of a certain class, the corresponding rotational speed of the oil rings employed conventionally will be approximately 120 rpm. Thus the quantity of oil delivered for lubrication of the bearings is less than ideal for the purpose of maximizing bearing life.

The reason for the loss in rotational speed includes the fact that the conventional oil rings employed make extensive contact with the walls defining the slots such as the slots 48 and 50. As FIG. 6 best illustrates, this contact is over a considerable length, for example from positions clockwise from the region 62 to the region 64 or counterclockwise from the region 64 to the region 62. Moreover, conventional oil rings have a rectangular cross section, which causes extra drag when the oil bridges the space to the stationary portions of the bearing.

Figures 7, 8:
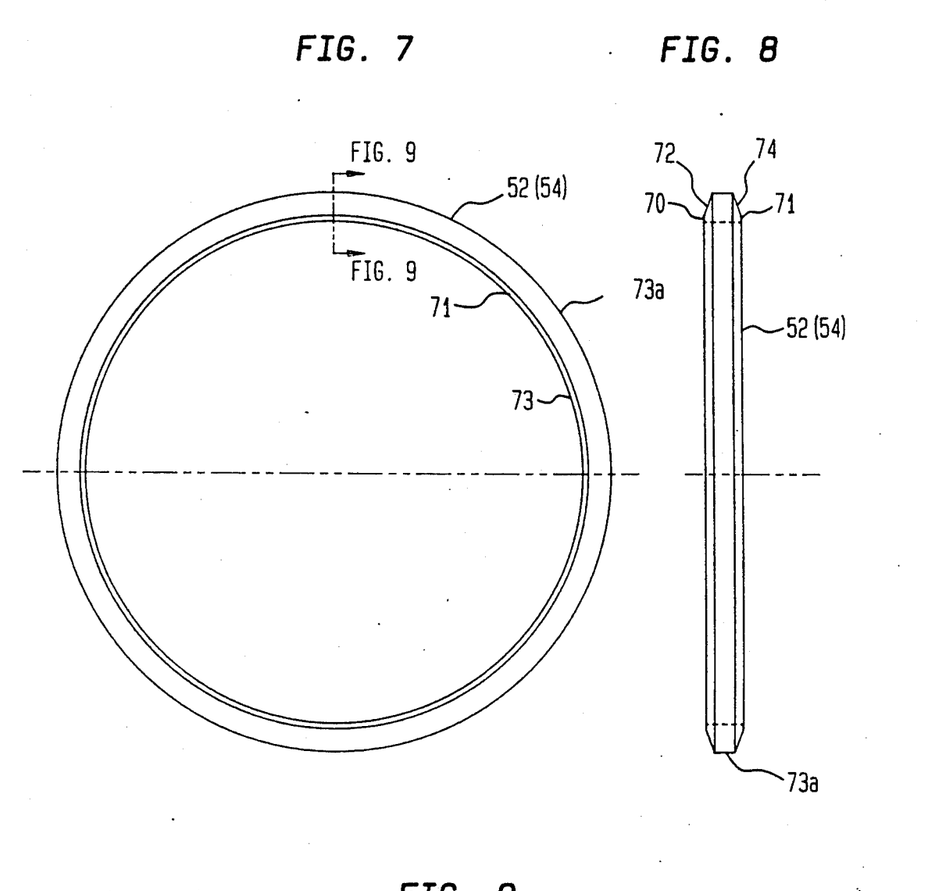
FIG. 7 is a view in the axial direction of the oil ring of FIG. 6 by itself.
FIG. 8 is a view of the oil ring of FIGS. 6 and 7 looking in a radial direction of the oil ring.
Figure 9:
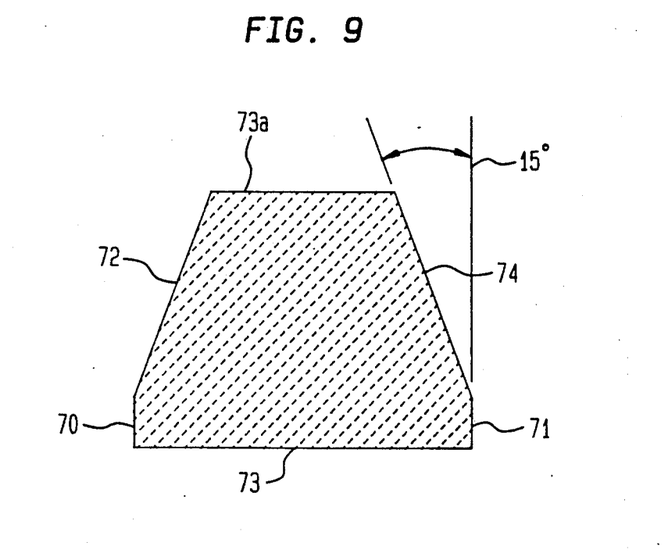
FIG. 9 is a view on a larger scale taken along the line 9—9 of FIG. 7 and looking in the direction of the arrows.

FIGS. 7–9 show the oil ring 52 or 54 in greater detail. While the oil rings can be made of a wide variety of materials, they are preferably made of SAE 660 bronze, chosen for minimum wear and a correspondingly long life. The dimensions are in proportion to the machine in which the oil ring is used and are limited axially by the size of the slot in which the oil ring is accommodated and radially by the diameter of the rotor shaft on the one hand and the position of the reservoir on the other. The shape of the oil ring can be varied to some extent. However, the oil ring is always circular and is designed to provide adequate lateral guiding surfaces 70 and 71 while reducing drag of the ring. Lateral guiding surfaces 70, 71 lie in planes perpendicular to the axis of the shaft of the rotor. The radial extent of these surfaces can be varied in accordance with the size of the motor. For example, in the case of a typical 700-horsepower motor, the radial extend of the surfaces 70 and 71 may be on the order of 0.060″. The frusto-conical surfaces 72, 74 form angles of 5° to 30° and preferably about 15° with the radial planes. This further reduces the drag of the oil, which bridges the stationary and moving surfaces. The drag thus does not inordinately slow the rotation of the oil ring. The inner surface 73 connecting the inner edges of the surfaces 70 and 71 and the outer surface 73a connecting the outer edges of the surfaces 72 and 74 are both cylindrical.

Only the surfaces 70, 71 make contact with the guide pins or rods 75a, 75b (FIG. 6). Since the surfaces 70 and 71 have a small radial dimension (preferably 5% to 40% of the radial distance between the inner and outer surfaces 73 and 73a, and ideally about 20% of that distance) and the guide pins or rods are cylindrical, the contact between the oil rings and the guide pins or rods has an exceedingly small "footprint." There are two such footprints associated with each oil ring. The footprints or areas of contact 76, one on either side of the oil ring, are at positions illustrated in FIG. 6 for the oil ring 54. The oil ring 52 also has a pair of footprints or areas of contact, one on either side of the oil ring 52. These footprints or areas of contact are shown at 78 in FIG. 6. Similarly, two more footprints or areas of contact are associated with each of the other two oil rings located at the other end of the machine 10. In other words, there are four oil rings that respectively make contact with four pairs of oil-ring guides.

The oil-ring guides are steel rods or dowels, captured in the body of the bearing bushing and elongate in a direction that is radial with respect to the axis of the shaft 16. Each guide rod has a cylindrical surface that protrudes beyond its supporting surface a short distance and is parallel to its supporting surface. While the dimensions are variable in accordance with the size of the motor and other factors that those skilled in the art can readily take into account, in a 700-horsepower motor the axial width of the slot may be 0.440″, the axial width of the oil rings 0.380″, and the axial clearance thus 0.060″.

In accordance with the invention, the oil rings are not guided by the entire length of the sides of the oil ring slots in the bearing bushing. These are very long surfaces, equal to the portion of the circumference of the oil ring adjacent to the top half of the bearing bushing and in some cases, as illustrated in FIG. 6, equal to a further portion of the circumference of the oil ring where it passes through the bottom half of the bearing bushing. In accordance with the invention, the oil ring makes contact with the slot in which it is received only at the protrusions constituted by the guide pins, and oil ring speeds are increased from about 120 rpm to 160–175 rpm for a motor speed of 3600 rpm. Since the amount of oil delivered by the oil rings to the bearings is proportional to the oil ring speed, a higher oil ring rotational speed results in a higher rate of oil delivery of the bearing. Since the oil rings are guided by the sides of the slot in the bearing bushing in a conventional structure, any roughness on the side of the bearing bushing increases the drag, thereby slowing the ring. In addition, if the oil ring and the oil ring slot extend into the lower half of the bearing bushing, this adds further drag to slow the ring. The oil-ring guides in accordance with the invention keep the oil rings away from the sides of the bearing bushing and thereby diminish the drag. Elimination of the variable oil ring drag due to manufacturing variances of the sleeve bearing bushings means that the oil ring speed is not only greater but also more predictable and uniform in accordance with the invention.

Moreover, placement of the oil ring guides at 45° on either side of the vertical provides equal lubrication regardless of the direction of rotation of the shaft.

Thus there is provided in accordance with the invention a novel and highly effective oil ring and oil-ring guide system that accomplishes the objects of the invention set out above. Many modifications of the preferred embodiment of the invention disclosed above will readily occur to those skilled in the art. Accordingly, the invention is not limited except by the appended claims.

I claim:

1. An oil-ring guide system comprising:
    a shaft elongate along a shaft axis and mounted for rotation about the shaft axis in at least one direction;
    a bearing supporting the shaft and formed with an oil-ring slot;
    an oil reservoir mounted below the bearing; and
    an oil ring received within the slot, supported by and encircling the shaft, and dipping into the reservoir, whereby rotation of the shaft in said direction causes rotation of the oil ring in the same direction so that the oil ring carries oil from the reservoir into the bearing for lubrication thereof;
    the slot being shaped with a protrusion extending towards the oil ring on at least one side of the oil ring to assist in guiding the oil ring, and the protrusion having a dimension that is small compared to the dimension of the slot in the direction of rotation of the oil ring, thereby reducing the drag on the oil ring and increasing the rotational speed of the oil ring in relation to the rotational speed of the shaft and increasing the amount of oil delivered to the bearing at a given rotational speed of the shaft.

2. An oil-ring guide system according to claim 1 wherein the shaft is mounted for rotation about the shaft axis in either of two directions and rotation of the shaft in either of said directions causes rotation of the oil ring in the same direction.

3. An oil-ring guide system according to claim 1 wherein the bearing includes upper and lower separable bushings and the slot extends through the upper bushing.

4. An oil-ring guide system according to claim 1 wherein the bearing includes upper and lower separable bushings and the slot extends through both bushings.

5. An oil-ring guide system according to claim 1 wherein the slot is shaped with a pair of protrusions respectively on opposite sides of the oil ring, each protrusion extending towards the oil ring to assist in guiding the oil ring and having a dimension that is small compared to the dimension of the slot in the direction of rotation of the oil ring.

6. An oil-ring guide system according to claim 1 wherein the slot has sides that extend radially with respect to the shaft axis and the protrusion is formed by a rod captured in the bearing, elongate along a rod axis extending radially with respect to the shaft axis, and having a cylindrical surface that protrudes into the slot for contact with the oil ring.

7. An oil-ring guide system according to claim 6 wherein the rod is made of steel.

8. An oil-ring guide system according to claim 1 wherein the oil ring is made of bronze.

9. In combination, oil rings and an oil-ring guide system therefor, said combination comprising:

a shaft elongate along a shaft axis and mounted for rotation about the shaft axis in either of two directions;

a pair of bearings supporting the shaft at locations spaced apart along the shaft axis, each bearing being formed with a pair of oil-ring slots, each slot having sides that extend radially with respect to the shaft axis;

means defining a reservoir below each bearing;

four bronze oil rings respectively received within the slots, each oil ring being supported by and encircling the shaft and dipping into the reservoir means, whereby rotation of the shaft in either of said directions causes rotation of the oil rings in the same direction so that the oil rings carry oil from the reservoir means into the pair of bearings for lubrication thereof, each of said oil rings being formed about an oil-ring axis and having a pair of lateral surfaces lying in planes that are radial with respect to the oil-ring axis, an inner surface connecting the lateral surfaces, and a pair of frusto-conical surfaces tapering towards each other in a radially outward direction respectively from radially outer edges of the lateral surfaces, the frusto-conical surfaces forming an angle of about 15°; and four pairs of steel rods, a first two of said pairs of steel rods being captured in one of said bearings and the other two of said pairs of steel rods being captured in the other of said bearings, each of said steel rods being elongate along a rod axis extending radially with respect to the shaft axis and having a cylindrical surface that protrudes into the slot for oil-ring contact, one pair of steel rods guiding each of said oil rings, the rods guiding each oil ring being respectively mounted on opposite sides thereof, one pair of rods in each bearing being displaced around the shaft axis 45° clockwise from the vertical and the other pair of rods in each bearing being displaced around the shaft axis 45° counterclockwise from the vertical.

* * * * *